Dec. 3, 1968 A. BICKERS ET AL 3,414,821

RADIO RECEIVER HAVING A PLURALITY OF I.F. STAGES WITH MEANS TO REJECT INTERFERING SIGNALS

Filed Sept. 2, 1964 2 Sheets-Sheet 1

United States Patent Office 3,414,821
Patented Dec. 3, 1968

3,414,821

RADIO RECEIVER HAVING A PLURALITY OF I.F. STAGES WITH MEANS TO REJECT INTERFERING SIGNALS

Arthur Bickers, Rowlands Castle, and Alan F. Evers, Portsmouth, England, assignors to Plessey-UK Limited, Ilford, England, a British company
Filed Sept. 2, 1964, Ser. No. 394,082
Claims priority, application Great Britain, Sept. 6, 1963, 35,337/63
3 Claims. (Cl. 325—433)

ABSTRACT OF THE DISCLOSURE

Radio receiver having at least two I.F. stages each stage having a mixer and a local oscillator wherein the local oscillators of the first two stages are actively associated with switch means operable for changing simultaneously and by the same amount the frequency of each oscillator thereby to change the first intermediate frequency for the avoidance of an unwanted signal whilst maintaining constant the second intermediate frequency.

This invention relates to superheterodyne radio receivers.

It is well known that superheterodyne radio receivers can respond to unwanted signals when harmonics of the interfering signal and the local oscillator mix in the first frequency changer of the receiver. As a result of this mixing of the harmonics a spurious intermediate frequency is generated. This spurious intermediate frequency will for certain values of the interfering frequency superimpose on the desired intermediate frequency.

It is an object of the present invention to provide a superheterodyne radio receiver in which this difficulty can be largely avoided.

Broadly in accordance with the present invention a superheterodyne radio receiver including at least one local oscillator which comprises a digital frequency synthesiser having side-step facilities which allows stepping from one channel to an adjacent channel thereof, the arrangement being such that the local oscillator frequency and thus the intermediate frequency can be changed by a multiple of the channel frequency separation of the synthesiser.

In a first arrangement the receiver also includes at least two intermediate frequency filters centred at different intermediate frequencies, switch means being provided for automatically selecting a required filter on changing the local oscillator frequency.

In an alternative arrangement in which the receiver is of the double heterodyne type the frequency of both local oscillators are shifted by the same amount during a side-step operation, and the second intermediate frequency filter is arranged to have a pass bandwidth which is equal to or less than said frequency shift amount so that the second intermediate frequency filter will pass only the required signal.

Figure 1:
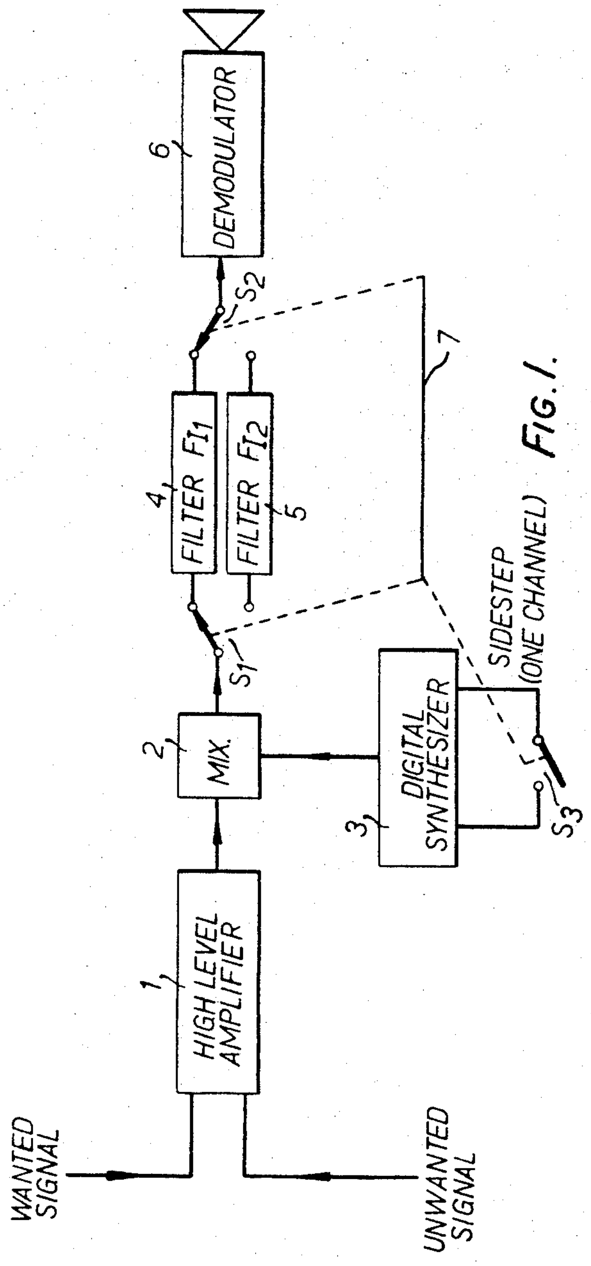
Figure 2:
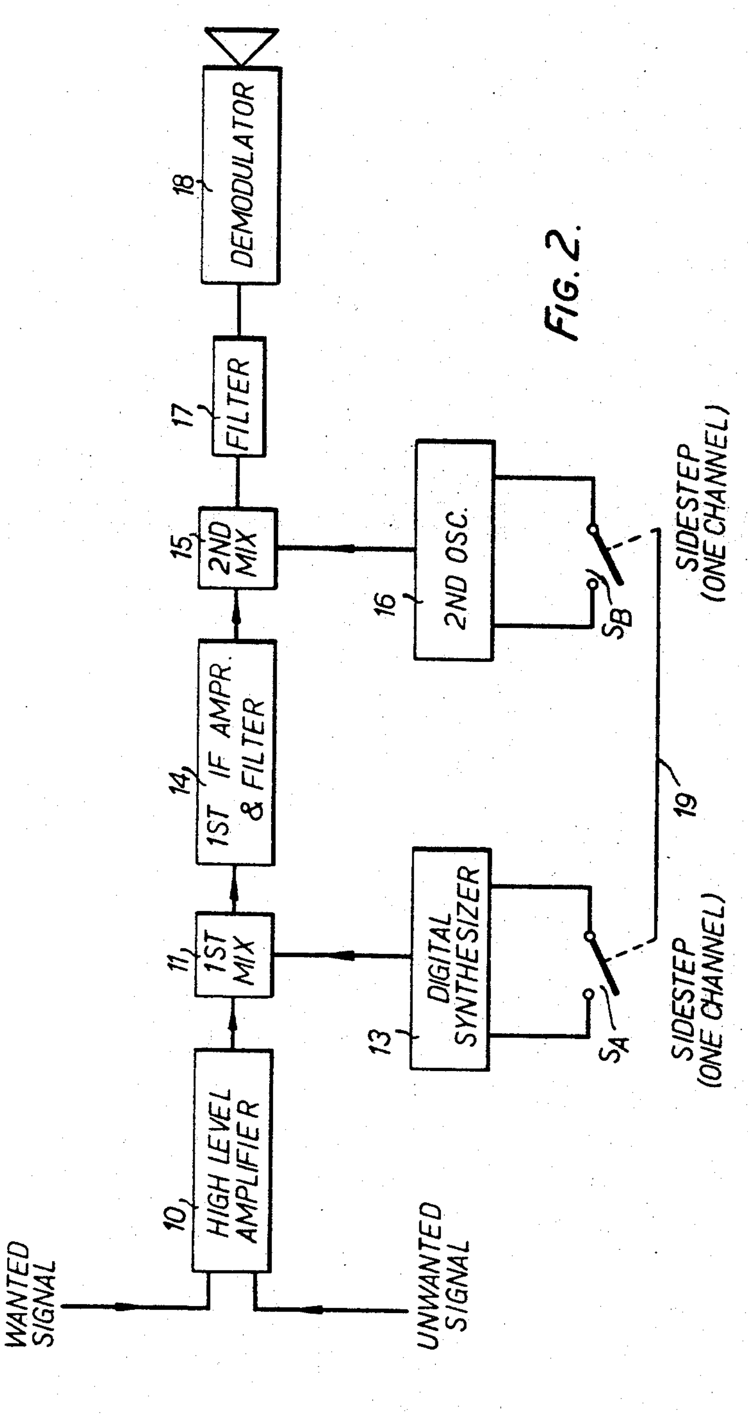

For a better understanding of the invention and to show how to carry the same into effect reference will now be made to the accompanying drawings, in which FIGURE 1 is a block diagram of a first embodiment of a superheterodyne radio receiver, and FIGURE 2 is a block diagram of a second embodiment of a superheterodyne radio receiver.

Before considering the construction of the receivers the theory underlying the elimination of the spurious intermediate frequency frequencies will be considered.

The basic equation which defines the values of interfering frequency for which such a spurious response can occur is $$mf_{\text{int}}-nf_{\text{lo}}=\pm f_{\text{if}_1} \quad (1)$$

where $f_{\text{int}}$ is the interfering frequency
$f_{\text{lo}}$ is the local oscillator frequency
$f_{\text{if}_1}$ is the intermediate frequency
$m, n$ are integers.

In addition the wanted signal frequency ($f_{\text{sig.}}$) and the local oscillator frequency (assuming $f_{\text{lo}}>f_{\text{sig.}}>f_{\text{if}}$) are related by the following equation, $$f_{\text{lo}}-f_{\text{sig.}}=f_{\text{if}_1} \quad (2)$$

If the receiver is tuned to receive a wanted signal $f_{\text{sig.}}$ and at the same time receives an interfering signal which satisfies Equation 1, then the interference may be eliminated by simultaneously changing the values of $f_{\text{if}}$ and $f_{\text{lo}}$ by the same amount. If the new value of the intermediate frequency is $$f_{\text{if}_2}=f_{\text{if}_1}+\Delta f \quad (3)$$

the relevant equations for the first frequency changer become, for the wanted response, $$(f_{\text{lo}}+\Delta f)-f_{\text{sig.}}=f_{\text{if}_1}+\Delta f \quad (4)$$

and for the unwanted response, $$mf_{\text{int}}-n(f_{\text{lo}}+\Delta f)=\pm f_{\text{if}_1}-n\Delta f \quad (5)$$

Thus the interfering I.F. has been separated from the wanted I.F. by at least $(n-1)\ \Delta f$, which has a minimum value of $\Delta f$ when $n=2$. If $\Delta f$ is greater than the pass bandwidth of the receiver the interfering signal may be rejected in one of two ways.

(a) By providing alternative I.F. filters centred at the two different intermediate frequencies ($f_{\text{if}_1}$ and $f_{\text{if}_2}$)

(b) By using a double superheterodyne receiver. If the frequency of the second local oscillator is also shifted by $\Delta f$, a fixed frequency second I.F. filter amplifier, whose pass-bandwidth is equal to or less than $\Delta f$, will pass only the wanted signal.

FIGURE 1 of the drawings indicates a circuit which is able to reject an interfering signal in accordance with (a) above. The circuit of FIGURE 1 includes a high level amplifier 1 whose input receives both the wanted signal and the unwanted signal, and whose output feeds into a mixing circuit 2. The local oscillator is formed by a digital frequency synthesiser 3 having side step facilities so that it can be stepped from one channel to an adjacent channel.

The output from the mixer circuit 2 is fed via one or the other of two intermediate frequency filter circuits 4, 5 to a demodulator unit 6.

A switch unit 7 is provided for switching the mixer output from one filter to the other, and for simultaneously switching the synthesiser 3 from one channel to an adjacent channel. The switch 7 has one pole $S_1$ interposed between the mixer circuit 2 and the two filters, a second pole $S_2$ interposed between the filters and the demodulator, and a third pole $S_3$ in the relevant side step channel of the synthesiser 3.

The above described receiver is intended to be able to reduce interference from very strong unwanted signals (of up to 100 v. R.M.S. amplitude) when these are present at the aerial terminal of the circuit of FIGURE 1. The receiver of FIGURE 1 forms part of a communications network which provides a large number of channels within a defined frequency band. The frequency separation between adjacent channels is constant and small compared with their centre frequency. The frequency synthesiser provides a stable frequency source for the transmitters and receivers. In a particular application the source of the interfering signal will be a 300 w. transmitter which operates in close proximity to the receiver. The aerials associated with the receiver and the interfering transmitter may be separated by as little as 5 feet. It is this close proximity of the transmitter and the receiver which is the cause of the strong interfering signals.

If interference of the type described occurs when the receiver is tuned to a wanted signal, the unwanted output may be eliminated by operating the single switch 7. The function of this switch 7 is to change both the first local oscillator 3 output frequency and thus the first intermediate frequencies by a small multiple of the channel frequency separation. This has the effect of introducing frequency separation between the wanted and unwanted signals, present in the first I.F. amplifier, which were previously superimposed.

The circuit shown in FIGURE 2 includes a high level amplifier 10 which is connected to receive as input both the wanted and the unwanted signals. The output of the amplifier 10 is fed to the input side of a first mixer circuit 11 having as its local oscillator a digital synthesiser 13 with side-step facilities. The mixer 11 is connected to a first intermediate frequency amplifier and filter unit 14. The first intermediate frequency output is fed to a second mixer stage 15 having a local oscillator 16 providing a choice of two frequencies separated by the chosen side-step. The second mixer 15 is connected via a second intermediate frequency amplifier and filter unit 17 to a demodulator circuit 18.

A switch unit 19 having poles $S_A$ and $S_B$ is provided for simultaneously switching the two local oscillators from a channel to an adjacent channel to change the local oscillator frequency applied to the two mixer units 11 and 15 respectively. The filtering unit 17 is a fixed frequency device whose pass bandwidth is equal to or less than the required small change $\Delta f$ in the frequency so that it will pass only the wanted frequency on the change of the associated local oscillator frequency by the same amount.

The second oscillator is preferably a switches crystal and not integrated with the main synthesiser for many applications of the receiver.

The circuit of FIGURE 2 is utilised in the same manner as the circuit of FIGURE 1.

It will be apparent from the foregoing that the operator of the receiver can select the local oscillator-frequency which provides the most satisfactory reception.

It will be appreciated that in the above receivers the actual frequency change is decided by the intermediate frequency bandwidth which is in turn decided by the intended application of the receiver.

What we claim is:

1. A radio receiver comprising a first mixer to which received signals are applied, a digital synthesiser which provides a first local oscillator frequency for the first mixer, a first intermediate frequency amplifier and filter unit connected to feed a first intermediate frequency from the first mixer to a second mixer, a second local oscillator providing for the second mixer a second local oscillator frequency, switch means associated with both the digital synthesiser and the second local oscillator and operative for changing their respective frequencies simultaneously by the same amount, and a second intermediate frequency filter fed from the second mixer and having a pass bandwidth which is not greater than the frequency change effected consequent upon operation of said switch means.

2. A radio receiver as claimed in claim 1 wherein the digital frequency synthesiser includes side step facilities which allow stepping from one channel to an adjacent channel thereof, the said switch means being operative for changing the first local oscillator frequency by a multiple of the channel separation frequency.

3. A radio receiver as claimed in claim 1 wherein the second local oscillator is a crystal oscillator.

References Cited

UNITED STATES PATENTS 2,029,035 1/1936 Roberts ---------- 325—437 XR

KATHLEEN H. CLAFFY, *Primary Examiner.*

R. S. BELL, *Assistant Examiner.*